Dec. 12, 1967   E. P. BURGER ETAL   3,357,163
AIR CLEANER ASSEMBLY FOR TRACTORS
Filed June 14, 1965   2 Sheets-Sheet 1
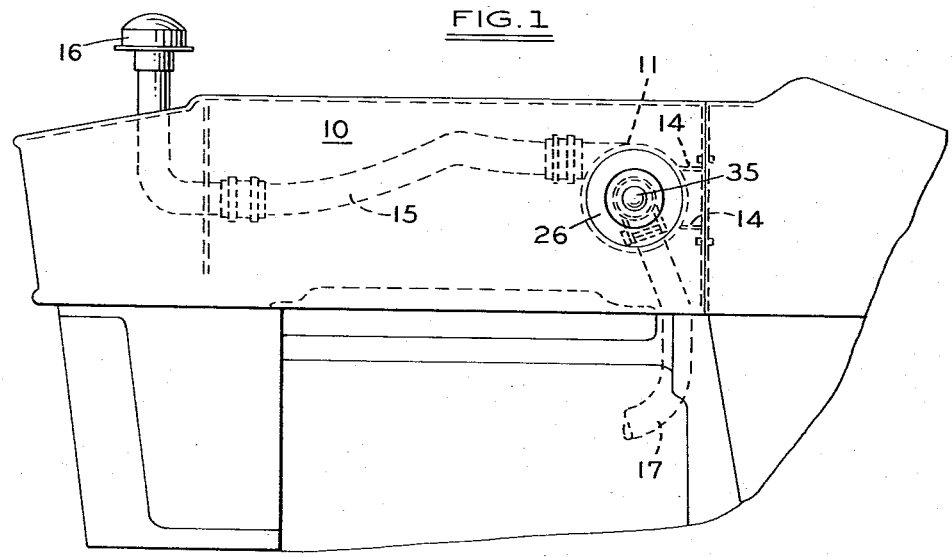
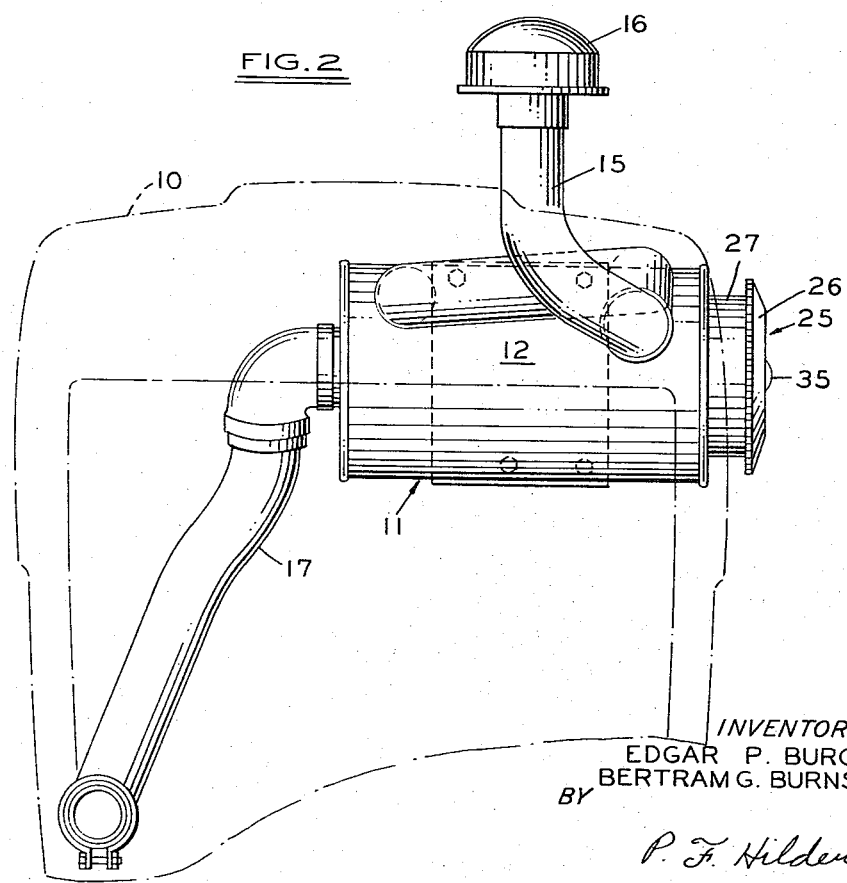
INVENTORS
EDGAR P. BURGER
BERTRAM G. BURNSIDE
BY
P. F. Hilden
ATTORNEY Dec. 12, 1967     E. P. BURGER ET AL     3,357,163
AIR CLEANER ASSEMBLY FOR TRACTORS
Filed June 14, 1965     2 Sheets-Sheet 2
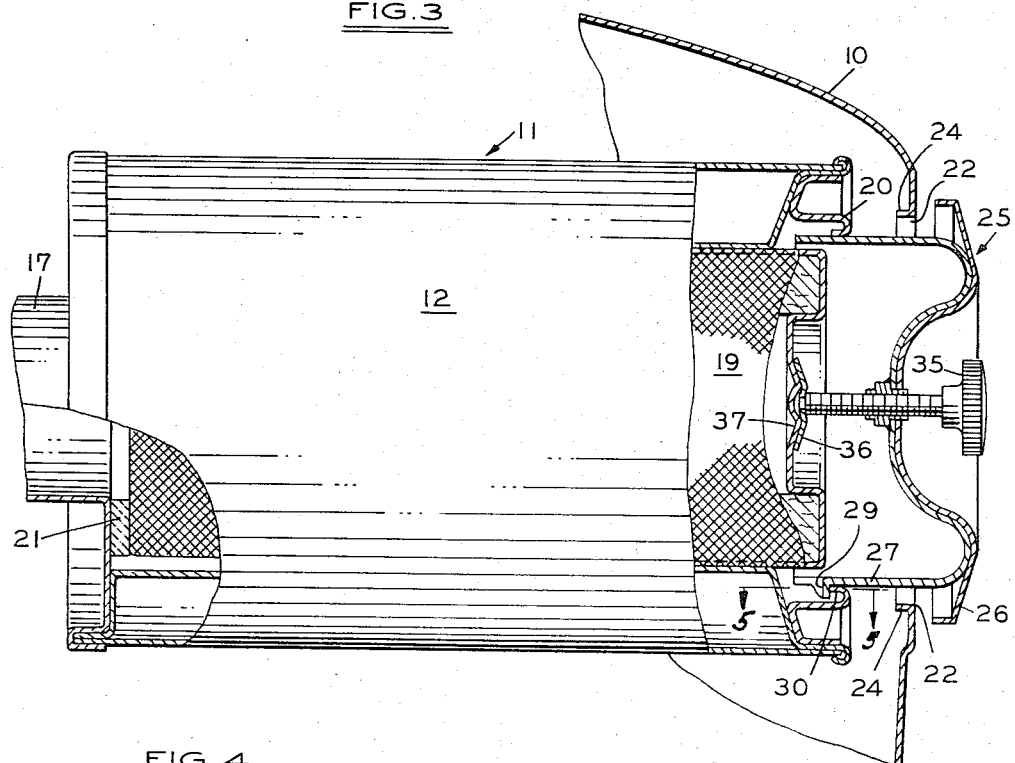
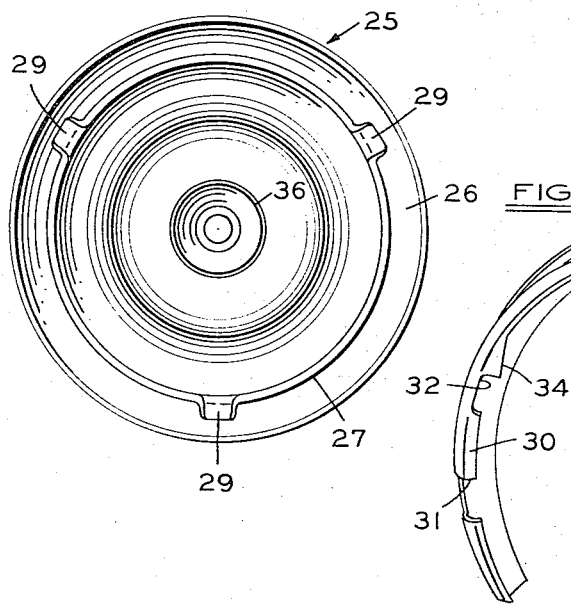
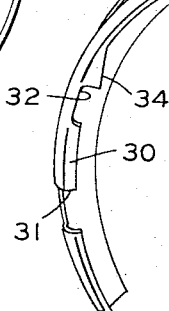
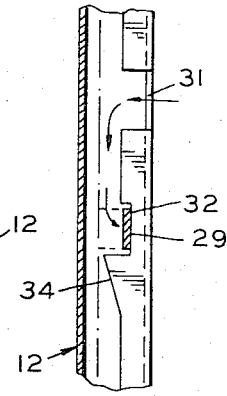
INVENTORS
EDGAR P. BURGER
BERTRAM G. BURNSIDE
BY
*P. F. Hilden*
ATTORNEY

United States Patent Office 3,357,163
Patented Dec. 12, 1967

3,357,163
AIR CLEANER ASSEMBLY FOR TRACTORS
Edgar P. Burger, Detroit, and Bertram G. Burnside, Birmingham, Mich., assignors to Ford Motor Company, Dearborn, Mich., a corporation of Delaware
Filed June 14, 1965, Ser. No. 463,605
3 Claims. (Cl. 55—385)

This invention relates to air cleaners of the replaceable filter element type for internal combustion engines.

Air cleaners of the above type frequently are provided with a cylindrical dry filter element which must be removed periodically for cleaning or replacement. One filter of this general type is disclosed in U.S. Patent No. 3,048,959 issued August 14, 1962 on the invention of W. W. Lowther.

It is desirable when incorporating air cleaners in vehicles, e.g., trucks and tractors, to mount the cleaner body so as to be enclosed and covered by the sheet metal covering the engine. Often in tractor constructions, the sheet metal adjacent the cleaner body is screwed or otherwise fixed in place in a semipermanent manner, and it is desirable to provide an opening through the sheet metal for removal and reinstallation of the filter element.

According to the present invention, an air cleaner of the above-described type is provided with a cover which serves to close an end of the air cleaner body, to close the hole in the sheet metal provided for removal of the filter element and to receive a hand screw which is tightened against the filter element to cause it to seat within the cleaner body for holding the cover against fortuitous displacement.

In the construction shown of the present invention, the cover provided for closing the hole in the tractor sheet metal permitting removal of the air filter element is provided with lugs engageable with the open end of the air cleaner body, the cover also serving to close the end of the body. The hand screw mounted in the cover serves the dual purpose of holding the air filter element tightly sealed about the periphery of the filtered air outlet and of holding the lugs of the cover in firm engagement with the air cleaner body.

Among the objects of the present invention are to provide an improved air cleaner construction and installation facilitating removal of the filter element for servicing; to provide such a construction which is simple and durable and of improved appearance; and generally to improve constructions of the type described.

Other objects, and objects relating to details and economies of construction will be more apparent from the detailed description to follow.

Our invention is clearly defined in the appended claims. In the claims, as well as in the description, parts may at times be identified by specific names for clarity and convenience, but such nomenclature is to be understood as having the broadest meaning consistent with the context and with the concept of our invention as distinguished from the pertinent prior art. The best form in which we have contemplated applying our invention is illustrated in the accompanying drawings forming a part of this specification in which:

FIGURE 1 is a somewhat diagrammatic side elevation of a portion of a tractor showing the tractor sheet metal, the air cleaner and air intake passages for the engine.

FIGURE 2 is a side elevation, on a somewhat enlarged scale, of the air cleaner and associated passages, the sheet metal of the tractor being indicated in broken line.

FIGURE 3 is an enlarged side elevation of the air cleaner, portions of the air cleaner and of the surrounding tractor sheet metal being shown in vertical section through the axis of the cleaner.

FIGURE 4 is an elevation of the inside surface of the cover.

FIGURE 5 is a fragmentary section taken along the inner periphery of the opening in the cleaner body, indicated by line 5—5 of FIGURE 3. Arrows indicate the method of engaging the cover with the cleaner body.

FIGURE 6 is a perspective view of a portion of the inner periphery of the air cleaner body, indicating the method of engaging the cover with the body.

Referring now to the drawings, the tractor to which the air cleaner installation of the present invention is applied is provided with the customary sheet metal 10 covering and at least partially enclosing an air cleaner 11. The air cleaner comprises a cylindrical body 12 which may be supported by two or more brackets 14. The cleaner 11 is provided with an air intake line 15 which may terminate in a weather hood or cover 16 projecting above the sheet metal hood portion of the tractor. A filtered air line 17 leads from the air cleaner 11 to the carburetor or intake manifold (not shown) of an internal combustion engine.

The air filter, which is of the type shown in Lowther U.S. Patent 3,048,959, includes a cylindrical, replaceable dry filter element 19 received within the body 12 of the air cleaner through an open end 20 in the body. The inner end of the filter element 19 is provided with a gasket 21 of resilient material for sealing about the periphery of the filtered air line 17 leading from the body.

The tractor sheet metal 10 is provided with a circular opening 22 opposite the open end 20 of the filter body 12. If desired, the margin of the opening can be turned inwardly to form a stiffening flange 24. The opening 22 in the sheet metal provides for removal and reinstallation of the filter element 19.

The open end 20 of the filter body 12 is closed by a removable cover 25, which may be made of sheet metal. This cover, which also serves as a cover to close the circular opening 22 in the sheet metal, preferably comprises a circular portion 26 overlying the opening and preferably extending radially somewhat beyond the margins of the opening. A generally cylindrical skirt portion 27 of the cover extends through the opening 22 in the sheet metal and serves to close the open end 20 of the filter body.

To hold the cover 25 in position, lugs 29, preferably three in number, are struck from the portion 27 of the cover to extend radially outwardly and are engaged with an inwardly turned lip 30 extending along the open end 20 of the filter body. The lip 30 may be provided with notches 31 positioned to permit passage of the lugs 29 as the cover is inserted in the end of the filter body and a second set of notches 32 of lesser extent, which serves to receive the lugs 29 after the cover has been inserted and twisted a few degrees as indicated by the arrows in FIGURES 5 and 6. Projections 34 may be formed on the lip 30 immediately beyond the notches 32 to aid in locating the lugs 29 within the notches.

A thumbscrew 35, threadedly engaged with the cover, extends axially of the cover. After the lugs 29 of the cover are engaged with the notches 32, the thumbscrew 35 may be tightened against the filter element 19 to (1) hold the opposite end of the filter element in sealing engagement about the filtered air line 17 by compressing the gasket 21 slightly and (2) bias the cover outwardly so that the lugs 29 are firmly engaged within the notches 32 to prevent fortuitous displacement of the cover. To facilitate engagement of the thumbscrew 35 with the filter element, an enlarged dished or conic portion 36 at the end of the thumbscrew engages with a complementary portion 37 received within a recess 39 within the end of the filter element.

The above-described construction is simple and economical, has a pleasing appearance and facilitates servicing the air filter.

We claim:

1. In a motor vehicle including an air cleaner comprising a tubular body having a first open end defining an opening and a second end provided with an axial outlet and an inlet in the sidewall of the body, a porous tubular filter element positioned generally axially within the body and having an open end communicating with the air cleaner outlet and the other end of the filter element being closed, gasket means extending about the outlet between the body and the filter element, and a sheet metal housing covering the air cleaner, the improvement comprising: an opening in the sheet metal housing spaced from and aligned with the opening in the open end of the body, the opening in the open end of the body being sufficient in size to admit the filter element, the opening in the housing being at least as large as the opening in the open end of the body to permit insertion of the filter element through the housing and into the open end of the body; a cover comprising joined first and second portions, the first portion being positioned axially outward of the housing and covering the opening therein and the second portion extending axially inward from the first portion and having a cylindrical sidewall provided with latching elements, the body including a radially inwardly extending wall extending about the opening thereof having means for engagement with the elements of the cover, and a shaft mounted on the cover and extending axially thereof and mounted for inward axial movement to force the filter element inwardly of the body to cause the gasket to seal about the outlet opening and hold the elements of the cover in engagement with the radially inwardly extending wall of the body to prevent fortuitous unlatching of the cover from the body.

2. In a motor vehicle air cleaner assembly as claimed in claim 1, the latching elements of the cover being radially displaced outwardly from the cylindrical sidewall and the radially inwardly extending wall of the body being provided with an inwardly turned flange slotted to pass the latching elements of the cover and being provided with portions adjacent the notches for receiving the latching elements.

3. In a motor vehicle air cleaner assembly as claimed in claim 1, the shaft mounted in the cover being an axially extending screw threadedly engaged with the cover.

References Cited

UNITED STATES PATENTS

| | | |
|---|---|---|
| 1,751,739 | 3/1930 | Jacobsen. |
| 1,918,006 | 7/1933 | Walton _____ 55—504 |
| 2,134,601 | 10/1938 | Cambell. |
| 2,162,439 | 6/1939 | Lintern et al. ____ 35—493 XR |
| 2,316,507 | 4/1943 | Dykeman _____ 220—44 |
| 2,329,248 | 9/1943 | Carlson. |
| 2,431,146 | 11/1947 | Steele _____ 261—92 |
| 2,908,417 | 10/1959 | Conner et al. _____ 220—40 XR |
| 3,048,959 | 8/1962 | Lowther _____ 55—399 XR |
| 3,078,650 | 2/1963 | Anderson et al. ___ 55—570 XR |
| 3,249,172 | 3/1966 | De Lorean _____ 35—385 |

FOREIGN PATENTS

| | | |
|---|---|---|
| 992,543 | 7/1951 | France. |
| 861,675 | 2/1961 | Great Britain. |

HARRY B. THORNTON, *Primary Examiner.*

B. NOZICK, *Assistant Examiner.*